Jan. 7, 1964    M. U. BAGWELL    3,116,503
AUTOMATIC LINE SELECTOR
Filed July 23, 1962    5 Sheets-Sheet 1
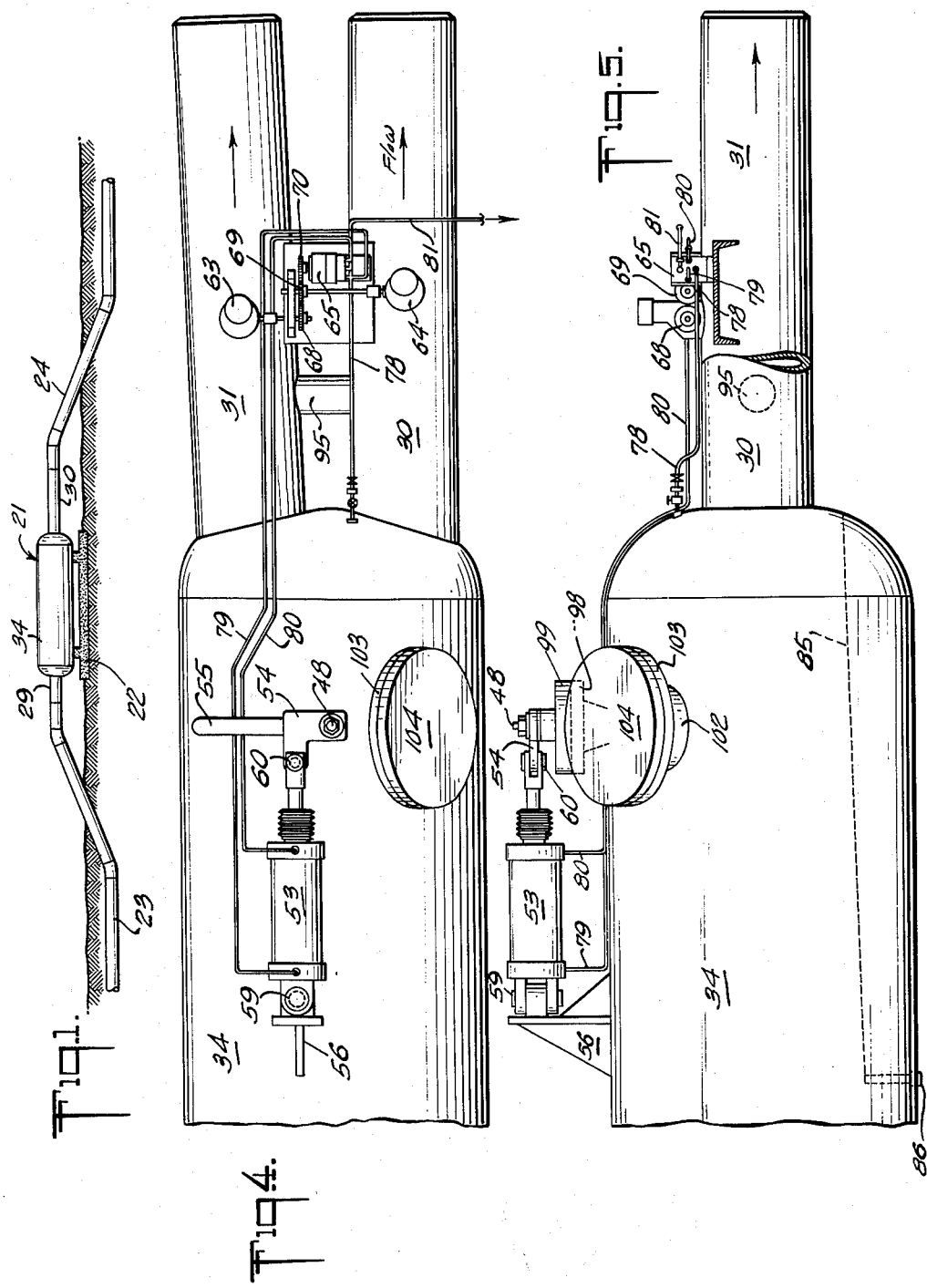

Jan. 7, 1964  M. U. BAGWELL  3,116,503
AUTOMATIC LINE SELECTOR
Filed July 23, 1962  5 Sheets-Sheet 2
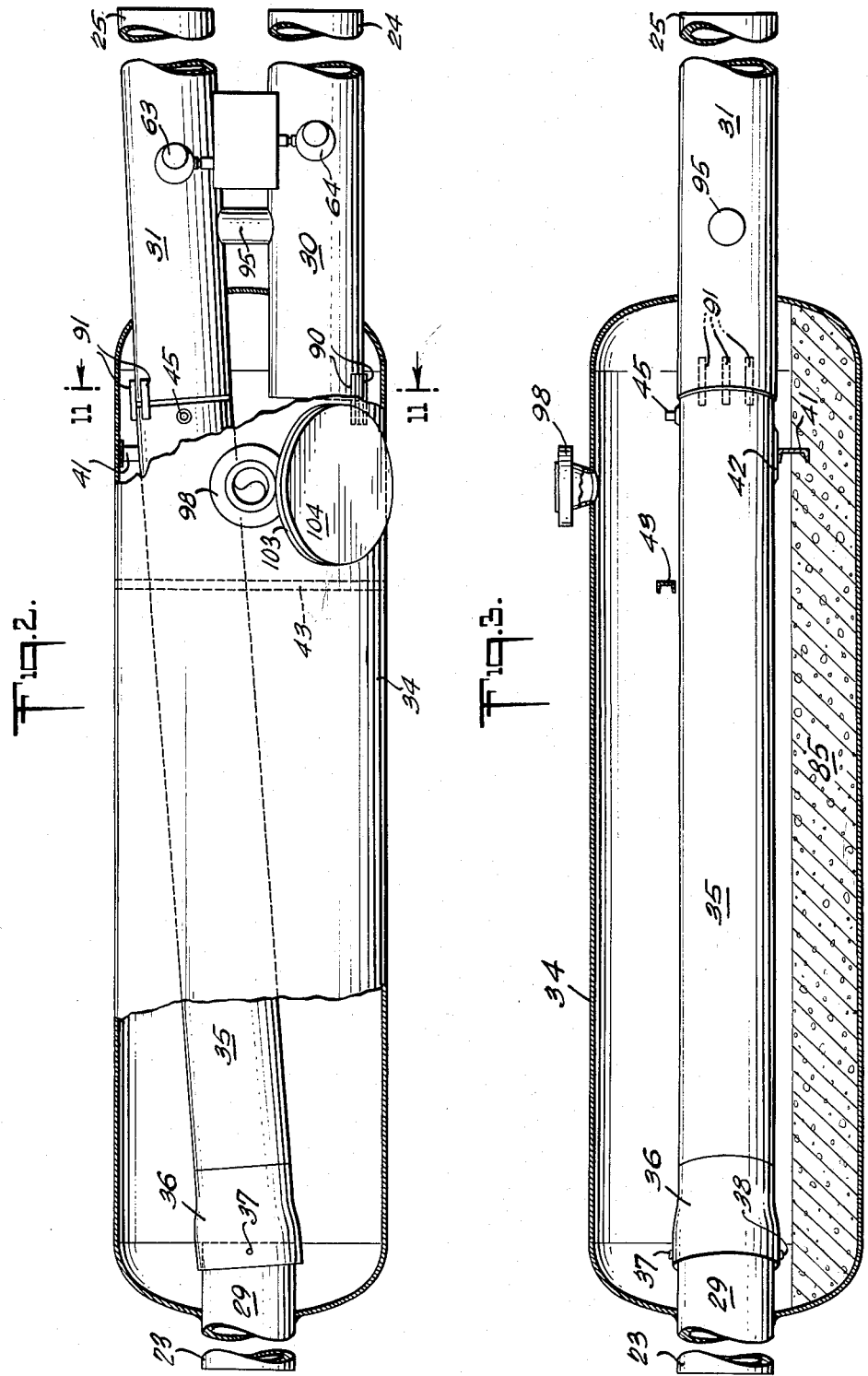

Jan. 7, 1964 M. U. BAGWELL 3,116,503
AUTOMATIC LINE SELECTOR
Filed July 23, 1962 5 Sheets-Sheet 3

Jan. 7, 1964
M. U. BAGWELL
3,116,503
AUTOMATIC LINE SELECTOR
Filed July 23, 1962
5 Sheets-Sheet 4
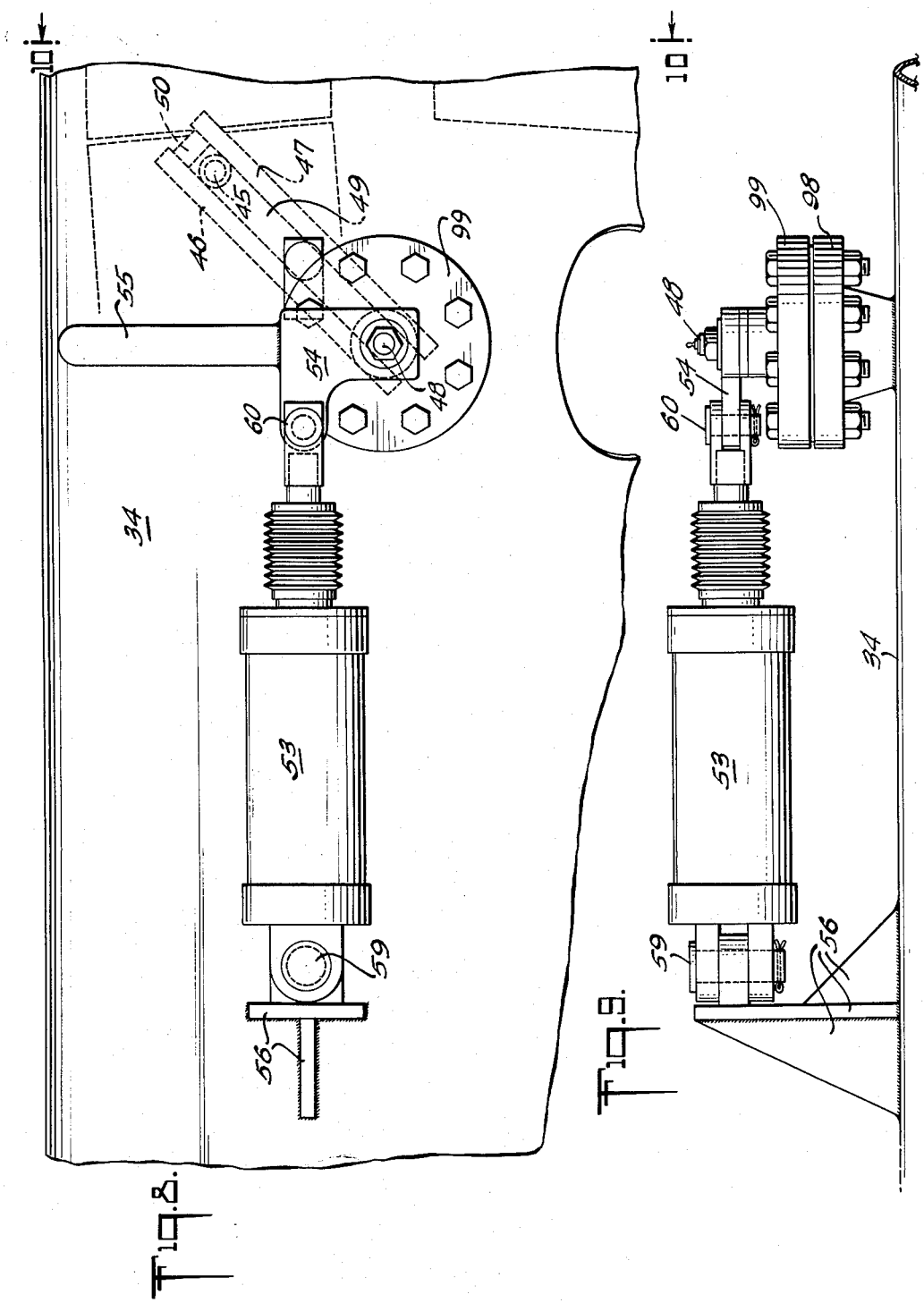

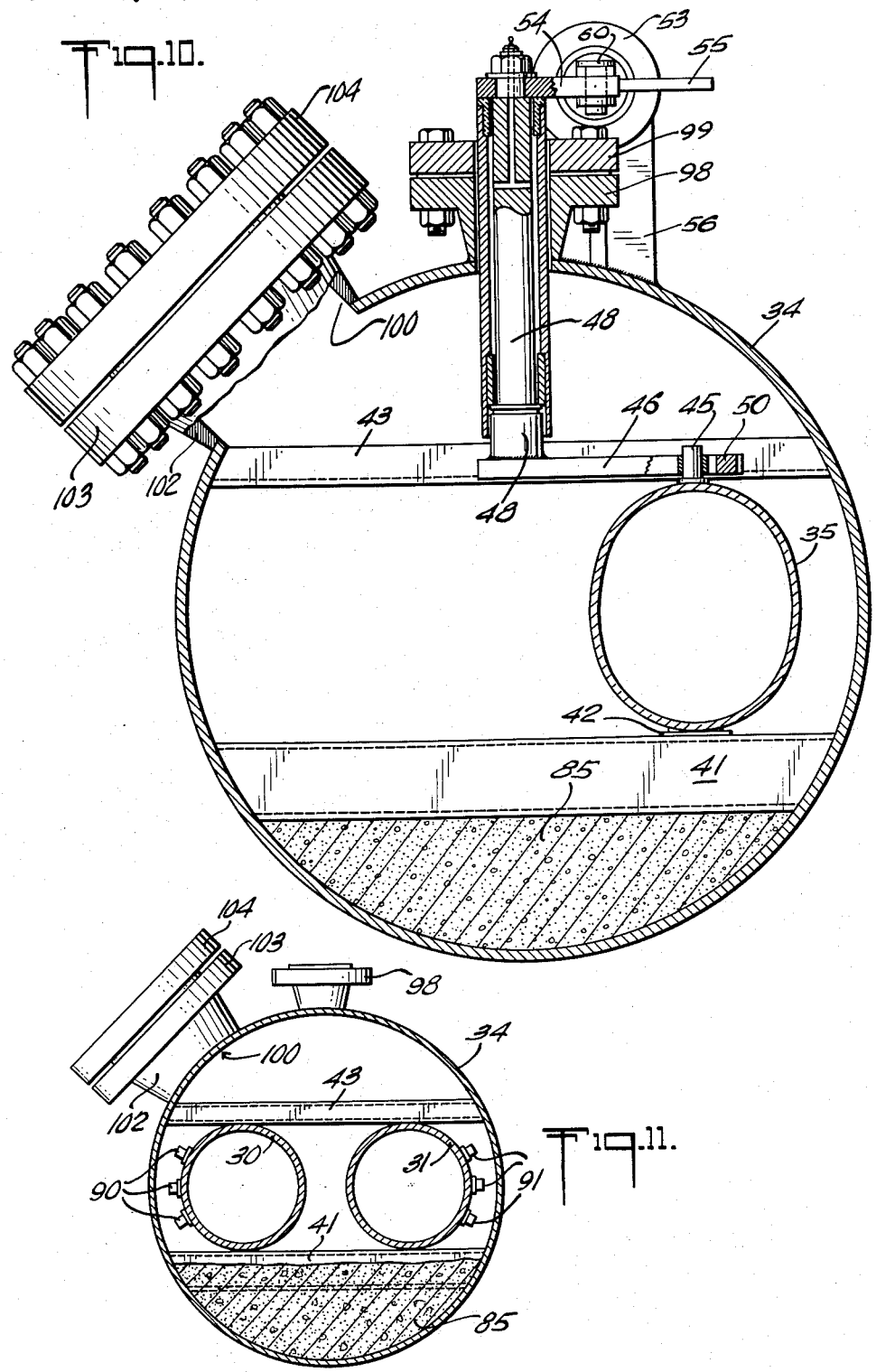

United States Patent Office 3,116,503
Patented Jan. 7, 1964

3,116,503
AUTOMATIC LINE SELECTOR
Marshall U. Bagwell, Houston, Tex., assignor to The Texas Pipe Line Company, Houston, Tex., a corporation of Texas
Filed July 23, 1962, Ser. No. 211,693
3 Claims. (Cl. 15—104.06)

This invention concerns pipe lines in general and is particularly applicable to a pipe line wherein a loop line is employed. More specifically the invention is concerned with an automatic line selector for scraper operations.

In the pipe line industry it is common practice to provide for periodic cleaning of the inner walls of a pipe line by inserting a scraper or pig, which is then driven through the line by the flow of pipe line fluid and thus acts to scrape the walls of the pipe line. In such operation, a scraper trap must be employed at each end of the section of pipe line that is cleaned, in order to insert and remove the scraper. Sometimes an increased capacity is provided for in a pipe line, or some section thereof (without adding additional pumping facilities), by providing one or more so-called loop lines. A loop line is actually no more than a parallel pipe line connected at both ends with the pipe line that is having its capacity increased.

Heretofore in connection with the scraping or cleaning operations of loop lines, it has been necessary to provide scraper traps at least at the beginning of both parallel lines of any given loop, although at the end of the loop the parallel connection may be made by a simple Y coupling and a scraper will thus pass from either section of the loop. However, scraper traps are quite expensive, in that they involve considerable equipment in the installation thereof. Furthermore, the operation involving use of a scraper trap constitutes a continuous expense in that the requirements are such that the pig or scraper must be returned from a downstream location, before each operating run through the pipe line after the first run.

Consequently, it is an object of this invention to provide means for simplifying the equipment required in connection with scraping operations involving a loop line.

Another object of the invention is to provide apparatus which is effective to eliminate the time and human effort which has previously been required in connection with scraper trap operations for loop lines.

Briefly, the invention is applicable to a pipe line having a loop line therein. The invention comprises in combination means for eliminating scraper traps at the upstream ends of a loop. The foregoing means comprises means for alternatively directing a scraper moving in said pipe line, upstream from said loop line, into one of the parallel connected lines of said loop. It also comprises sensing means in said parallel connected lines, as well as means controlled by said sensing means for actuating said scraper directing means.

Again briefly, the invention is applicable to pipe lines and may be described as an automatic line selector which comprises in combination, means for connecting a plurality of pipe lines in parallel from the downstream end of a pipe line. The said connecting means includes a unitary fluid-tight housing and a pivoted sleeve in said housing for alternatively directing the passageway from said downstream end of the pipe line to one of said plurality of pipe lines. The combination also comprises power means for shifting said sleeve from one to another of said alternative directing positions, sensing means in said plurality of pipe lines for determining passage of a scraper therethrough, and means for actuating said power means under control of said sensing means for shifting said sleeve after passage of said scraper through one of said plurality of pipe lines.

The foregoing and other objects and benefits of the invention are set forth below in greater detail in connection with a preferred embodiment thereof which is illustrated in the drawings, in which:

FIGURE 1 is a side elevation, taken in cross section through a surface section of the earth and showing a unit according to the invention, schematically;

FIGURE 2 is an enlarged plan view partly broken away in cross section, showing the unit according to the invention;

FIGURE 3 is a similarly enlarged, elevation shown partly in cross section and illustrating interior structure of the unit;

FIGURE 4 is a further enlarged detail, shown in plan view thereof;

FIGURE 5 is a side elevation view of the same further enlarged detail that is illustrated in FIGURE 4;

FIGURE 8 is a still more enlarged detail, shown in plan view and showing the power means for actuating the line selector unit;

FIGURE 9 is a side elevation, showing the same power means illustrated in FIGURE 8;

FIGURE 10 is a transverse elevation of the entire unit, partly in cross section and taken along the lines 10—10 of FIGURE 8, looking in the direction of the arrows; and FIGURE 11 is a transverse cross section view taken along the lines 11—11 of FIGURE 2, looking in the direction of the arrows.

Figure 6:
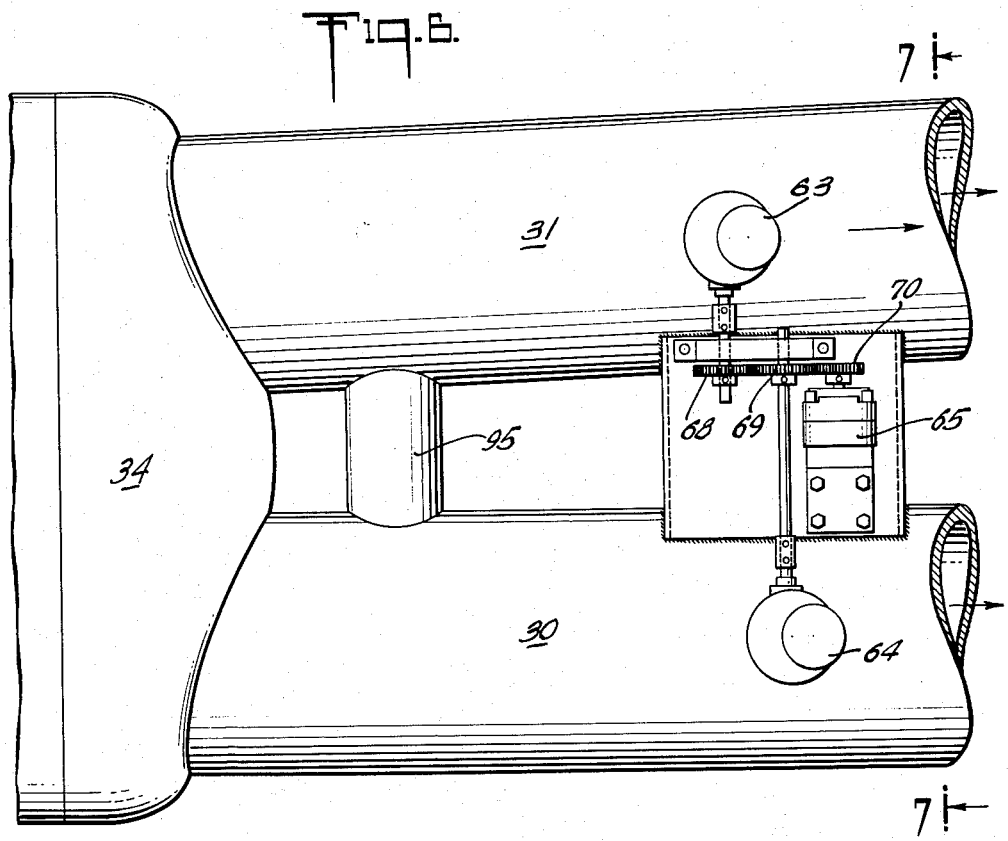
FIGURE 6 is a still more enlarged detail, shown in plan view and illustrating the sensing means.

Referring to FIGURE 1 it is pointed out that a complete unit according to the invention may be mounted in any convenient manner, e.g. that illustrated where a selector unit 21 is mounted above ground on a concrete base 22. The unit acts to connect a single pipe line 23 to a pair of parallel pipe lines 24 and 25 (FIG. 2) which together make up a loop line as described above. It will be observed that in making this fluid connection, the unit 21 has a short pipe or nipple 29 on the upstream end thereof while there are two similar nipples 30 and 31 on the downstream end of the unit. The unit 21 as constructed is made up with a housing 34 having a fluid-tight interior construction. This may be done in any convenient manner, such as by having nipples 29, 30 and 31 welded to housing 34 where they pass into the interior thereof.

It is pointed out that the unit 21 might, if desired, be constructed for being situated below the surface of the ground, by arranging a pit or similar feasible structure for housing the unit.

Within the housing 34 of the unit, there is a sleeve 35 that is pivoted near the upstream end thereof. Such pivot is constructed by employing a short flanged end piece 36 which has an enlarged inside diameter at the open end thereof so as to fit over the end of the upstream pipe line nipple 29. The pivot may be one having any convenient type of structure, such as a pair of lugs 37 and 38 illustrated. This pivot structure is arranged with the pivotal axis thereof substantially vertical so that the sleeve 35 may swing horizontally. This means that it may swing from the position illustrated in FIGURES 2 and 3, where the sleeve is in alignment with the downstream nipple 31, to a similar position in alignment with the other downstream nipple 30.

It will be observed that there is a transverse support beam 41 that extends across the interior of the housing 34 near the free swinging end of the sleeve 35 and acts as a vertical support for the sleeve. In this connection, there is a flat shoe 42 attached to the under surface (exterior) of the sleeve 35 so as to rest on the upper surface of the beam 41. Shoe 42 may be attached to the sleeve 35 in any feasible manner such as by welding, and the shoe acts to provide an even wearing surface for the frictional sliding engagement with the beam 41. Shoe 42 also provides structure such that the tendency for the sleeve 35 to roll about its longitudinal axis, will be reduced. There is a cross beam 43 situated just above the sleeve 35 to insure vertical alignment of the sleeve and the nipples 30 and 31.

In order to provide for shifting sleeve 35 from one position to the other, so as to direct a scraper from pipe line 23 alternatively into either of pipe lines 24 or 25, there is a power means provided which is coupled by structure that includes a cam follower lug 45 located on the top near the free end of the sleeve 35. In order to act upon the cam follower lug 45, so as to shift or swing the sleeve 35 from one position to the other, there is a cam means or cam type mechanism that includes a pair of horizontally situated arms 46 and 47 that are both securely fastened to a shaft 48 (e.g. by welding as shown in FIGURE 10) so as to form a slot 49 therebetween. This slot 49 acts as the camming surface in connection with the cam follower lug 45, so that when shaft 48 is rotated the arms 46 and 47 are swung or pivoted about the axis of shaft 48 which causes the lug 45 to move transversely as it slides longitudinally within the slot 49. Of course, transverse movement of the lug 45 causes the sleeve 35 to swing horizontally from one of its positions to the other. It will be observed that there is a cam strengthening cross member 50 near the ends of the arms 46 and 47.

In order to rotate the shaft 48 and thus actuate the cam means for positioning sleeve 35, there is a power means comprising cylinder and piston unit 53 which is connected to the shaft 48 for causing rotation thereof by means of a crank arm 54. There may be also a manual operator arm 55 which is attached to the crank arm 54 and extends outward from the axis of shaft 48 so as to provide extra leverage. It will be observed that the power unit 53 may be attached to the upper surface (exterior) of housing 34 in any convenient manner, such as by means of a bracket structure 56 as illustrated. The cylinder and piston unit 53 is attached to the bracket 56 in a pivotal manner, by means of a pivot pin 59 and related structure, so that the unit may swing horizontally as required when the crank arm 54 is rotated about the axis of the shaft 48 to which it is attached. Similarly the piston-shaft end of the unit 53 has the shaft attached to the crank arm 54 by means of a pivot pin 60, for permitting pivoting action which is necessary to prevent binding within the cylinder and piston unit 53.

Figure 7:
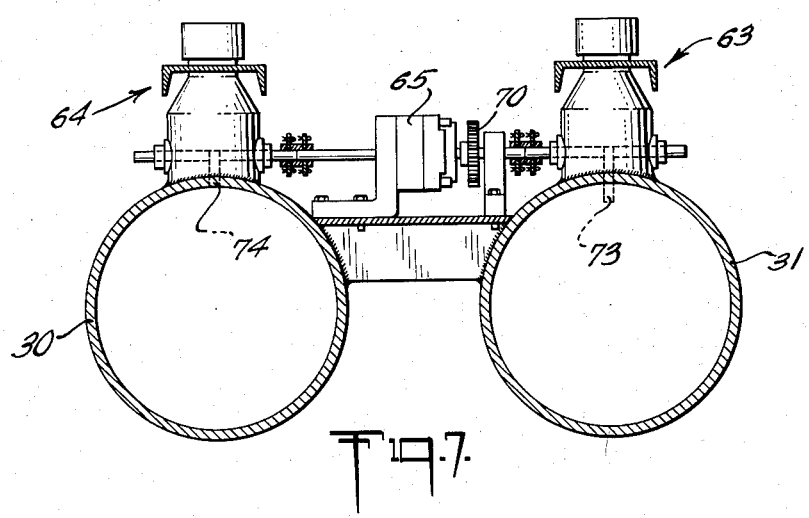
FIGURE 7 is a transverse cross section view, taken along the lines 7—7 of FIGURE 6 looking in the direction of the arrows.

Referring particularly to FIGURES 6 and 7, it is pointed out that there are a pair of sensing units 63 and 64. These units act alternatively in sensing, or determining the passage of a scraper; and it is their function then to create a signal which will be applied so as to control the power unit 53 for actuating the same and causing the scraper directing sleeve 35 to be shifted from its then existing position to the opposite one.

These sensing units 63 and 64 form no part, per se, of the invention and may be commercially available types. In this instance, the sensing units are mounted with the outputs connected together for actuating a fluid control element 65. This is carried out in the illustrated manner which includes the attachment of a gear 68 to an extension of an output shaft of unit 63 and another gear 69 that is mounted meshing with gear 68 but that is carried on a shaft which is an extension from an output shaft of unit 64. There is in addition a third gear 70 that is mounted in meshing relation with gear 69 and that is carried on an input shaft of the control element 65.

With the foregoing arrangement when one of the sensing units 63 or 64 is actuated by the passage of a scraper, the output shaft thereof is rotated, thus rotating the corresponding gear 68 or 69 and at the same time causing the other one of these two gears to be rotated thereby while gear 70 is also rotated by reason of the meshing relationship of all three gears (see FIGURES 4–7). Consequently the gear 70 will be rotated in one direction or the other depending upon which of the sensing units 63 or 64 is actuated. This will cause a pilot valve structure (not shown) within control element 65, to be shifted from one position to the other whichever sensing unit is actuated. In addition, it is to be noted that as either sensing unit is caused to rotate by the passage of the scraper, the rotation thereof will drive the other unit so as to reset same, while at the same time the control element 65 is being shifted.

Like sensing units 63 and 64, the control element 65 may be a commercially available type of pilot valve. In the illustrated arrangement, the valve action will act to alternatively connect a source of fluid under pressure to one side or the other of the piston in the power means 53 while the opposite side is connected to a sump for completing a return path for the fluid. This will be made quite clear below.

In connection with the foregoing, it may be noted that the structure of each sensing unit 63 and 64 includes a finger 73 and 74 respectively that is attached to the respective shaft of each unit as illustrated. Consequently, when a scraper passes it will come in contact with and swing the finger up out of the interior space of the pipe line nipple 30 or 31 on which it is located, while rotating the shaft to which it is attached through an arc of about seventy degrees. It is this rotation that drives the corresponding gear 68 or 69 for thus causing the foregoing action which includes resetting of the other pivot finger while positioning the control element 65.

It will be appreciated that the control element 65 might be electrical in nature, if desired, assuming, of course, that the cylinder and piston unit 53 were electrical in nature or that the fluid system had an electrically controlled transducer. However, it is preferred to employ a pilot valve unit as in the illustrated system, which will act in a well known manner to direct fluid pressure signals from a supply pipe 78 (FIGURES 4 and 5) to the pilot valve control unit 65 for determining connection of fluid pressure from the supply, i.e. system pressure, to one side of the piston of power unit 53 via one of a pair of pneumatic lines 79 or 80. It will be understood that as one of the fluid lines 79 or 80 is connected to supply pressure from pipe 78, the other will be connected to exhaust (a sump, as indicated by the caption), e.g. by means of an exhaust line 81.

It is pointed out that although the control system shown is hydraulic in nature (assuming the pipe line is carrying a liquid), it might be pneumatic if desired or combined electric and pneumatic. However, it is preferred to employ the arrangement illustrated in order to avoid a separate source of power such as the pneumatic or electric arrangements would require.

In the foregoing manner, the power unit 53 will be actuated from one position to the other, i.e. contracted or expanded, so as to position the crank arm 54 to one or the other of its extreme positions. Rotation of the crank arm 54 will in turn cause the sleeve 35 to be swung from one position to the other, as determined by the power unit 53. It will be noted that in this manner the entire selector unit 21 (FIGURE 1) will act automatically whenever a scraper passes through, to cause the unit to shift from the position occupied as the scraper passed, to the opposite position for thus directing the next scraper passage through the opposite one of the downstream pipe lines 24 or 25. Consequently a scraper may be run through a pipe line which includes a loop connection, and each time such scraping operation is carried out the selector unit will automatically set itself so as to direct the scraper through the opposite branch of the loop line from that taken by the preceding passage of the scraper.

It will be observed that within the housing 34 there may be a floor structure such as that illustrated, which is formed by pouring concrete 85 into the bottom of the housing. This will provide additional support and stability in respect of the transverse beam 41. There may be provided in conjunction with the concrete floor 85, a drain 86 (FIGURE 5) that is located at the lowest portion of the floor 85 which is preferably formed having some slope toward such low spot to provide drainage that is desirable in connection with removing undesirable accumulations of water or the like.

It is to be noted that the interior of housing 34 is constructed in a fluid-tight manner which is necessary since the pivot structure for sleeve 35, as well as the free end thereof, is arranged in a manner which permits flow of the pipe line fluid into the interior portion of housing 34.

It is pointed out that there are a plurality of line-up or stop bars 90 and 91 that are attached to the outside edges of the nipples 30 and 31 respectively and act to stop the swinging motion of the sleeve 35 when it is in alignment with the corresponding nipple 30 or 31. These stop bars may be attached in any convenient manner, such as by being welded to the exterior of the respective nipple.

There is a cross connection between the two loop lines 24 and 25 which takes the form of a smaller diameter pipe 95 that is located outside of but near the downstream end of housing 34 and interconnects the interior of nipple 30 with the interior of nipple 31. This cross connection provides fluid flow passage for carrying out the parallel fluid connection of loop lines 24 and 25.

It will be appreciated that there is appropriate structure employed in conjunction with the power unit, for operating the camming action of sleeve 35 from one of its positions to the other. Such structure preferably takes the form illustrated, which includes a flanged shaft-housing 98 that holds the bearing structure for shaft 48 and that includes a usual upper plate 99 that is bolted onto flange 98 when the elements are assembled for operation.

There may be provided an access opening 100 (FIGURES 10 and 11) to the interior of housing 34, such as that illustrated, which includes a short sleeve 102 therover that supports a flange 103 to accommodate a cover plate 104 that is bolted down for securing the fluid-tight interior structure of the housing 34.

While a particular embodiment of the invention has been described above in considerable detail, this is not to be taken as in any way limiting the invention but merely as being descriptive thereof.

I claim:

1. In a pipe line, an automatic hydraulic line selector for directing a scraper comprising in combination:
   (a) a pipe line including a parallel connecting loop line therein
   (b) a fluid-tight housing containing means for alternatively directing said line to each of the parallel connected branches in said loop
   (c) a pair of mechanically interconnected pivoted arms, one located in each of said branches adjacent to said housing, for sensing passage of said scraper
   (d) a pilot valve unit
   (e) hydraulic power means for actuating said alternative directing means
   (f) positive mechanical means for actuating said pilot valve unit and the other of said pivoted arms, when one of said arms senses passage of a scraper
   (g) a hydraulic pressure supply line connected to said housing, and
   (h) hydraulic circuit means for interconncting said pilot valve unit, said power means and said pressure supply line for causing actuation of said hydraulic power means under control of said pilot valve unit without the use of a separate source of power.

2. The combination according to claim 1 including in addition:
   (i) a cross connection for pipe line fluid flow between said branches, adjacent to said housing, for providing the parallel connection.

3. The combination according to claim 2 including in addition:
   (j) a poured floor in said housing, having a central drain therein for removing undesired accumulations.

References Cited in the file of this patent

UNITED STATES PATENTS

| | | |
|---|---|---|
| 721,743 | Richmond | Nov. 21, 1902 |
| 1,102,323 | Collins | July 7, 1914 |
| 1,951,434 | Needham | Mar. 20, 1934 |
| 3,047,020 | Barrett | July 31, 1962 |

FOREIGN PATENTS

| | | |
|---|---|---|
| 658,003 | Germany | Mar. 18, 1938 |